(12) United States Patent
Steenackers

(10) Patent No.: US 7,009,633 B2
(45) Date of Patent: Mar. 7, 2006

(54) SYSTEM AND METHOD FOR LASER MARKING

(75) Inventor: Bart Steenackers, Boom (BE)

(73) Assignee: Agfa-Gevaert, Mortsel (BE)

( * ) Notice: Subject to any disclaimer, the term of this patent is extended or adjusted under 35 U.S.C. 154(b) by 101 days.

(21) Appl. No.: 10/304,986

(22) Filed: Nov. 26, 2002

(65) Prior Publication Data

US 2003/0218670 A1 Nov. 27, 2003

(30) Foreign Application Priority Data

May 22, 2002 (EP) .................................. 02100545

(51) Int. Cl.
*B41J 2/435* (2006.01)

(52) U.S. Cl. .................................................. 347/227

(58) Field of Classification Search ................ 347/239, 347/240, 243, 251, 252, 255, 256, 260, 224–225, 347/241, 227; 219/121.63, 121.68, 121.84, 219/121.67, 684, 698, 700, 137.41, 121.64; 427/554
See application file for complete search history.

(56) References Cited

U.S. PATENT DOCUMENTS

| | | | |
|---|---|---|---|
| 4,315,133 A | | 2/1982 | Morgan et al. ........ 219/121.76 |
| 4,554,560 A | | 11/1985 | Kanaoka et al. ............ 347/259 |
| 4,652,722 A | | 3/1987 | Stone et al. ........... 219/121.84 |
| 5,359,176 A | * | 10/1994 | Balliet et al. .......... 219/121.84 |
| 5,538,764 A | * | 7/1996 | Li et al. ..................... 427/554 |
| 5,837,962 A | * | 11/1998 | Overbeck .............. 219/121.68 |
| 5,906,760 A | * | 5/1999 | Robb et al. ............ 219/121.67 |
| 5,940,115 A | * | 8/1999 | Nakamura et al. .......... 347/251 |
| 5,981,901 A | * | 11/1999 | La Rocca .............. 219/121.63 |
| 6,037,968 A | * | 3/2000 | Emge et al. ................. 347/260 |
| 6,400,389 B1 | * | 6/2002 | Shaffer et al. .............. 347/241 |

FOREIGN PATENT DOCUMENTS

| | | |
|---|---|---|
| EP | 0 519 391 | 12/1992 |
| EP | 0661 866 A2 | 7/1995 |
| EP | 1 110 628 A1 | 6/2001 |
| EP | 1 120 685 A1 | 8/2001 |
| JP | 54040378 A * | 3/1979 |
| JP | 10254224 | 9/1998 |
| JP | 11274249 A * | 10/1999 |
| JP | 2000250369 | 9/2000 |
| JP | 2000263276 A * | 9/2000 |
| JP | 2001228742 | 8/2001 |
| JP | 2001318576 | 11/2001 |
| JP | 2001318577 | 11/2001 |

* cited by examiner

*Primary Examiner*—Hai Pham
(74) *Attorney, Agent, or Firm*—Joseph T. Guy; Nexsen Pruet, LLC

(57) ABSTRACT

A system for laser printing indicia on a moving web has been disclosed, wherein said system includes an apparatus having one or more laser beam(s) as source(s) of laser energy, a jet of air, an extraction unit and a tunnel with an open entry side and an exit side, and wherein, in the laser marking method, the product flow in the tunnel is directed from the open entry side to the exit side of the tunnel; the jet of air, skimming on the laser-impinging surface, from the entrance of the tunnel in the moving direction of the web; and wherein extraction of the product flow is performed at the exit side of the tunnel.

25 Claims, 2 Drawing Sheets

7 lasers in parallel:
T1,...,T7 laser times may differ

SYSTEM AND METHOD FOR LASER MARKING

FIELD OF THE INVENTION

The present invention relates to the field of laser marking systems, and more particularly, to a system with an apparatus making use of laser energy for marking indicia on a moving substrate and, more particularly, on a photosensitive web. In particular the present invention relates to a marking method applied on a photosensitive web material in which the mark can be confirmed in an undeveloped state or developed state of the photosensitive material. Moreover the invention relates to a marking method suitable for use in order to record a mark on a photosensitive film, more particularly a film for use in medical diagnostic image forming systems after X-ray exposure and processing of said film.

BACKGROUND OF THE INVENTION

Conventionally known marking methods make use of a mechanical device in order to transfer e.g. ink contained in an ink pad to the surface of an object in order to provide it with a stamp carrying information thereupon. An individual stamp in an automated process is repeated for subsequent objects. Because of its mechanical nature and the drying time associated with ink, an ink stamping process is relatively slow. Moreover, if the mark is accidentally touched prior to complete drying, the mark will smudge. Another problem associated with ink stamping methods is that the quality of ink stamped marks may substantially vary with time. This variation may be dependent upon the quantity of ink applied, ambient temperature and humidity, and/or the condition of the surface of the stamp. In any event, the consistency of a stamped mark may vary widely from one object out of a series to another.

Moreover application of ink is not always preferable, more particularly, when the material has to pass e.g. through wet processing solutions.

As a result of the deficiencies associated with ink stamping, it has become increasingly popular to use a laser beam to mark the surface of an object. Unlike ink stamping, laser marking is very fast, requires no curing time, has a consistently high quality, and can take place at the end of the manufacturing process. Moreover laser markings more easily withstand passage through processing solutions than ink stamps.

Laser beam marking thus provides an economic and rapid method of writing, bar coding and decorative marking of plastics in general and is an advantageously used technique over current printing technologies because of the ease at which the layout can be adjusted using graphic computer programs and ease of integration into a production line. In some applications laser marking is a well known and important means for quickly and cleanly inscribing by irradiating a target surface, like e.g. a plastic surface, with laser light, thereby providing it with permanent informational indicia marks, such as characters, letters, figures, symbols, bar codes or images, date codes, batch codes, bar codes or part numbers, functional marks, such as computer keyboard and electronic keypad characters, and decorative marks, such as company logos. In some applications such laser marks are moreover made visible and readable in a dark or dimly lit environment as e.g. in order to read informational indicia on items, such as clocks, emergency exit signs, safety information signboards, interior automobile control buttons, and the like. The term "indicia" further refers to any laser mark including, but not limited to, alphabetical characters, numbers, drawings or patterns. Laser marking is a contact-free procedure: it makes marking possible, even on soft, irregular surfaces that are not readily accessible. Laser marking is ink-free, which provides long-lasting applications and it is solvent-free, which makes it more ecologically acceptable and resistant to passage in processing baths.

Making use of a laser in order to mark an object suitable for this application is a fast and economical means of marking. However certain disadvantages associated with state-of-the-art laser marking techniques that merely burn the surface in order to achieve the desired mark, as e.g. an image on the surface of a chip clearly visible at nearly every angle of incidence to a light source.

A mark burned in a surface by a laser, on the other hand, may further contain contaminants deposited on the surface subsequent to marking and those contaminants may blur or even obscure the mark. Additionally, because the laser actually burns the surface of the work piece the associated burning may cause damaging because of temperatures exceeding acceptable limits.

Surfaces not suitable for being marked by a laser may moreover require laser reactive coatings to be applied onto their surface, wherein application of such coatings may take additional manufacturing procedures and manufacturing time. Nevertheless as in U.S. Pat. No. 4,769,310 a method for laser marking of ceramic materials making use of an inorganic pigment has e.g. been described as an illustration that not only soft substrates can be laser marked.

With respect to conventional edge marking in the particular application field of photographic film manufacturing it is well-known that printing involves some sort of identification indicia along the edge of film rolls during the finishing operation. Edge marked films provide direct verification of roll identity, sheet identity and waste identity during all stages of the manufacturing process. Edge marked films moreover provide accurate footage identification that enables operators to quickly identify, trace and remove film imperfections, thereby minimizing the amount of product waste. The importance of edge marking of film becomes clear from the fact that it increases process understanding by allowing process interactions to be more closely identified with their corresponding effect on the product.

Furtheron traditional embossing marking techniques may be replaced by laser edge marking as current mechanical embossing techniques by embossing wheels are not accurately programmable, generate poor quality marks and require excessive maintenance. Laser edge marking however is particularly advantageous in industry because it provides a permanent record and can be read before and after film processing. Advances in laser technology provided use of dot matrix $CO_2$ laser marking systems in order to replace existing embossing technologies. Apart from an undeniable advantage of laser marking of film at a required throughput rate, an unacceptable level of fog spots may occur for marking light-sensitive photographic films, due to light flashes of the laser burning process. A further shortcoming resulting from application of these advanced high powered laser systems used for edge marking photosensitive film is that by-products, produced during marking may impinge on the film surface. Laser energy by-products in form of smoke and irradiated debris on the film surface are known to further cause the localized fogging on the film, even when the film is flushed in an inert gas atmosphere, substantially free from oxygen.

More recent developments in laser technology enabled the development of high speed marking systems using short pulse lasers. Short pulse laser exposure on photosensitive film show promising results in reducing the occurrences of fog spots. Air jets directed at the laser impingement point on the film surface are further known to reduce the occurrence of fog. Statistical methods have been employed to gain information on fog incidence reduction when laser marking photosensitive film. Moreover laser pulse width has hitherto been thought not to have a significant effect on fog, opposite to laser peak power.

There are several laser types available for marking plastic surfaces. $CO_2$ lasers allow speeds up to 10,000 mm/sec. At 10,600 nm the $CO_2$ laser enables laser marking by thermochemical reaction, melting, vaporizing and engraving. A Nd:YAG laser allows speeds up to 2000 mm/sec. The Nd:YAG laser at 1064 nm provides laser marking by carbonization, sublimation, discoloration, foaming and engraving. At lower power levels at 532 nm, the Nd:YAG laser marks by leaching or selective bleaching of dyes and pigments. These lasers have good flexibility in text and imaging and broad flexibility in marking based on several phenomena, such as melting, foaming, vaporizing and engraving. An excimer laser with the frequency in the range of 196–351 nm leads to the marking of plastic surfaces by photochemical ablation or reaction.

Conventionally the name of a maker, the kind of film, the effective usable period and the lot No. are marked on a photosensitive material such as an X-ray film, since it is necessary to confirm the marks in the undeveloped state of the photosensitive material due to the convenience on the handling.

More recently an apparatus for marking indicia on a moving photosensitive web has been described in EP-A 1 120 685 wherein said apparatus comprises a source of laser energy; a laser printer means operably connected to said source of laser energy, said laser printer means being provided with a laser head; a laser beam tube connected to said laser head, said laser beam tube having an active end; and, a nozzle element structurally associated with said active end of said laser beam tube, said nozzle element comprising a chamber having a laser energy inlet end and a laser energy outlet end; an air jet member arranged in said chamber for directing a burst of air onto a laser beam impingeable surface; at least one lens arranged in said chamber for focusing each one of a plurality of laser beams passing through said chamber; a lens cleaning member arranged in said chamber proximate to said at least one lens; and, a vacuum port extending from said chamber, said vacuum port providing means for evacuating said chamber of smoke and debris generated during laser marking; and wherein said laser head has a plurality of lasers disposed therein for generating a plurality of laser beams, a lens arranged in said laser beam tube for focusing said each one of a plurality of laser beams along a predetermined optical path through said laser beam tube and into impinging contact with said moving photosensitive web thereby producing said indicia thereon. Said nozzle element has been described in detail in EP-A 1 120 684. Working with such a nozzle element however lays burden on the velocity with which the moving web can run relative to the laser apparatus, the more as nowadays very high laser marking speeds are envisaged.

The problem thus becomes aggravated as dust stick to the film surface is reinforced, as sparks occur and as harmful fog is caused in the vicinity of the mark on the film by the sparks.

OBJECTS OF THE INVENTION

It would be advantageous to provide a marking technique that combines the speed and precision of laser marking with the contrast and distinctiveness of e.g. ink stamping, without any substantial manufacturing time or precautions to be taken into account.

Therefore, a need persists for variable information to be permanently marked on each sheet of photosensitive web, such as a photographic film, without significant incidences of fog spots on the surface of the film.

It is, therefore, an object of the invention to provide a marking method of forming a mark, character or figure on the said photosensitive web material while substantially reducing the occurrence of deleterious fog spots thereon, simultaneously recording a high precise image by the use of a dot type laser marker.

It is another object of the invention to provide a system comprising an apparatus for laser marking indicia on a moving photosensitive web by exposing a moving photosensitive web to laser energy while controlling the peak power of the laser energy.

A further object of the present invention is to provide a laser marking system comprising an apparatus and use thereof in a method wherein an object, preferably a moving photosensitive web, is subjected to the localized heat created by a laser beam and wherein excess material deposited on the non-irradiated portion, that is, the portion of the surface not contacted by the laser beam, is quickly removed in order to get a clean surface.

Further objects will become apparent from the description hereinafter.

BRIEF DESCRIPTION OF THE DRAWINGS

Figures hereinafter are related with laser marking concepts for marking photosensitive materials of the present invention as will further be explained in the detailed description hereinafter.

SUMMARY OF THE INVENTION

In order to reach the objects of the present invention asystem for laser printing indicia on a moving (preferably photosensitive) web is provided, as well as a method of laser marking and use of a laser marking apparatus in the said system, as has been given in the claims depending thereupon.

As an essential feature the system of the present invention is characterized in that it comprises one or more laser beam(s) as source(s) of laser energy, a jet of air, an extraction unit and a tunnel with an open entry side and an exit side.

Figure 1:
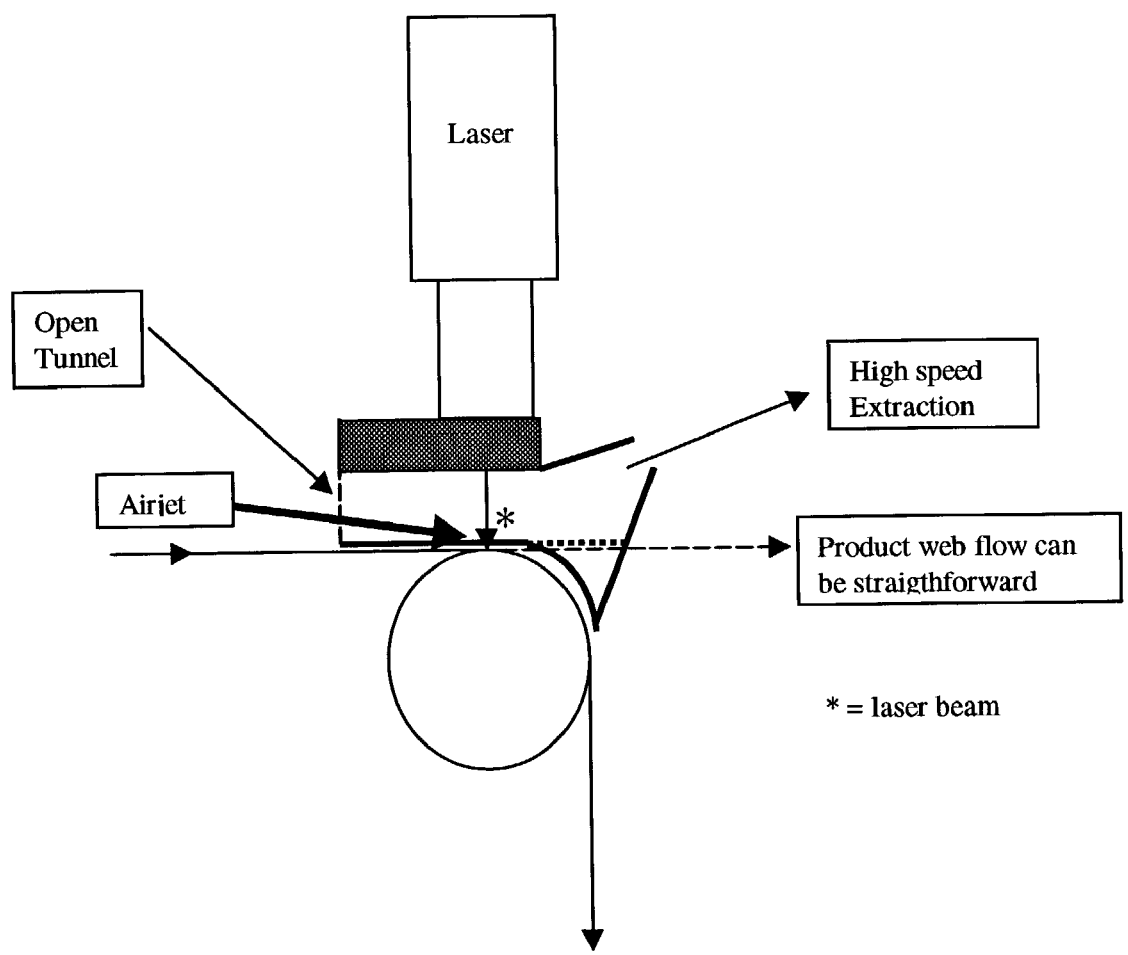
FIG. 1 is illustrative for a laser marking process with an "open tunnel".

The said open tunnel has been illustrated as a part of FIG. 1, wherein an overview has been given of the whole environment of the moving web (can be moved straightforward or rolled up), inclusive for the laser, the open tunnel, the jet of air and the extraction unit, providing high speed extraction. According to the method of the present invention extraction proceeds by means of a high speed extraction unit at the exit side of the said tunnel.

A laser marking method according to the present invention is further characterized by a product flow directed from the open entry side in the tunnel to the exit extraction side of the said tunnel. Moreover a jet of air, skimming on the laser-impinging surface, is directed from the entrance of the tunnel in the moving direction of the web. Furtheron extraction proceeds at a high speed at the exit side of the tunnel by means of the extraction unit.

Specific features for preferred embodiments of the invention are set out in the dependent claims.

Further advantages offered by making use of such a laser marking apparatus in a system as described, besides the main result of dramatic reduction in the occurrence of fog thereupon, will become apparent from the following description.

DETAILED DESCRIPTION OF THE INVENTION

By making use of a laser marking apparatus in the system as described hereinafter and applying a laser marking method, in particular onto a photosensitive material, said material thus comprises an indication that is readable before processing and that becomes even more clearly visible after processing. Laser marking of a photosensitive material is very critical as during the marking process, characterized by ablation and combustion phenomena, light may be emitted, thus causing fog spots on the material. Even with "invisible" laser wavelengths in the far infrared region (as e.g. with $CO_2$-lasers, having wavelengths in between 9 and 11 $\mu m$) and from which no photographic effect is expected with respect to direct exposure of the photosensitive material, the marking process may result in visual light emissions and exposure of the photosensitive material. Such light flashes may thus cause unacceptable big black fog spots on the material. In order to avoid such fog spots and in order to prevent these damaging side effects it is a key issue to keep the laser energy density on the product stable and as low as possible as during marking a plasma or dust cloud is generated, which may cause secondary light flashes in form of small "fires", due to combustion of plasma and dust near the laser-impinging surface. In order to avoid this it is important to remove the plasma and dust in a fast and efficient way. The higher the marking and product speed, the higher the plasma and/or dust concentration will be and the higher the risk of light flashes.

A better extraction of the said plasma and dust is highly desired. In order to avoid fog spots, caused by burning of plasma and dust particles, it is important to remove the plasma and dust as quick as possible and to get it away from the laser beam during marking. It is therefor recommended not to create a "chamber" near or around the laser head because of the risk of getting high plasma and/or dust concentrations near the laser beam so that locally big light flashes or explosions may be caused. The best solution therefor is provided by creating a tunnel with an open entry side and an exit side, which is led to a strong extraction unit.

According to the present invention system for laser printing indicia on a moving web is thus provided, characterized in that said system comprises an apparatus having one or more laser beam(s), a jet of air, an extraction unit and a tunnel with an open entry side and an exit side. It is preferred that said exit side is led to a (strong) extraction unit. According to the present invention a method of laser marking and use of a laser marking apparatus in the system according to the present invention is also claimed.

It is highly preferred to have, in the system of the present invention, the product flow directed from the entry side to the exit is side, thereby generating an airflow in the direction of the extraction exit side of the tunnel as otherwise the cloud will become pulled back under the laser beam, thus resulting in a higher risk of secondary combustions and light emissions, that are responsible for fog on the laser marked film in that case. As a higher production speed requires a higher marking speed, a higher plasma concentration will locally be present if the plasma cloud is not removed. Otherwise a higher production speed is in favour of generation of a faster moving air flow caused by the product flow itself. The efficiency is moreover enhanced by directing an air jet, skimming on the laser-impinging surface, from the entrance of the tunnel in the direction of the product flow.

According to the present invention, a system is thus offered characterized by the step of directing product flow from the open entry side of the extraction tunnel to the exit side of the extraction tunnel of the laser marking apparatus comprised in the said system. By the method according to the present invention the said product flow is carried by a jet of air, skimming on the laser-impinging surface and further directed from the open entry side of the extraction tunnel towards the exit side of the extraction tunnel in the moving direction of the web.

Moreover in order to mark critical layers and products and to get controll of the marking process, and more particularly, of penetration depth, it is important to keep the energy density on the product stable. According to the present invention a laser marking method is offered wherein, besides the step of directing product flow from the open entry side of the extraction tunnel to the exit side of the extraction tunnel of the system, the laser penetration depth is held constant by keeping the laser energy density on the said web stable by applying said laser in continuous mode at a fixed power level in combination with an acousto optic deflector crystal, wherein for every frequency used or for every deflection position the energy density on the product is tuned. The laser marking apparatus used in the system according to the present invention is thus provided, when used in a continuous mode, with one or more laser(s), provided with an acousto optic deflector crystal (AOD). According to the present invention said laser or lasers in continuous mode are, in the system as claimed, each independently, provided with an acousto optic deflector crystal (AOD).

A method is further offered by means of an apparatus with multiple lasers used in the system according to the present invention, where the penetration depth in the moving web is tuneable with burn time or pulse width of the driving electronics of the different lasers independently for each laser.

As a starting point presence of dust or dirt on the product should thus be avoided as much as possible. Moreover dust and plasma particles are generated by the marking process itself and as these are highly flammable and may cause light emissions and fog spots on the material, it is of utmost importance to keep the product clean in order to prevent repeating marks on the same spot. Following concepts have been proved in order to prevent these damaging side effects.

In order to mark the material on different positions, in order to build alphanumeric characters, to create logos and drawings, different techniques are used in order to keep the energy stable, thereby preventing damaging of the laser marked material by light flashes.

Figure 2:
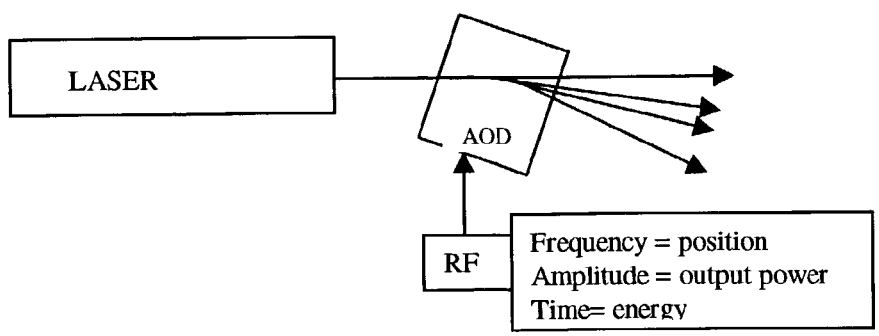
FIG. 2 shows a laser in continuous mode in combination with an AOD crystal (Acousto Optic Deflector).

Illustrated in FIG. 2 is a laser in continuous mode in combination with an acousto optic deflector crystal or AOD, in order to mark the material on different positions. In this concept the laser itself is working in a continuous mode at a fixed power level. The beam is deflected by a high frequency signal and it is a property of the AOD (Acousto Optic Deflector) crystal that the efficiency is not equal all over the crystal and deflection positions. For every frequency used or for every deflection position the energy density on the product can be tuned in two ways. Tuning the amplitude for each frequency deflection position will result in a more equal energy density on the product. By adjusting the time a frequency is gated to the AOD crystal (dwell time): independently for each frequency deflection position the energy density on the product will be tuned. Laser and AOD must be cooled efficiently and held stable, because temperature shocks and drifts will result in energy density changes. According to the method of the present invention tuning the amplitude proceeds for each frequency deflection position and by adjusting the dwell time a frequency is gated to the AOD crystal.

Figure 3:
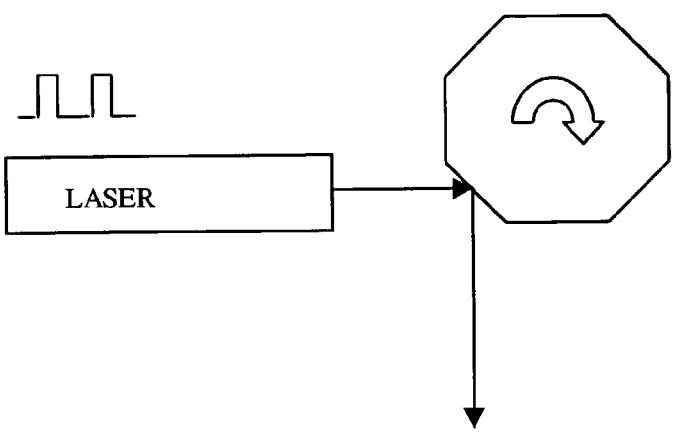
FIG. 3 shows a pulsed laser in combination with moving deflecting mirrors, wherein the laser itself is electronically pulsed.

In FIG. 3 a pulsed laser in combination with moving deflecting mirrors has been shown: in this concept the laser itself is electronically pulsed. The laser beam is deflected by a rotating polygon or by a galvano-oscillating mirror and in this concept the laser pulses used are often very short and the energy packages included in those pulses are not easy to control and are difficult to be kept stable. Also the marking process on the product is not easy to control with short intense laser energy pulses. It is recommended to use longer, less intense laser energy pulses which will give a smoother and better controllable marking effect. According to the present invention a method is offered, wherein energy packages included in energy pulses of a pulsed laser are provided by longer, less intense laser energy pulses.

By putting the laser out of focus or putting an attenuator or diaphragm (see "black box" in FIG. 1) in the laser beam path, problems in beam homogenity (hot spots), peak intensity in the spot, will be smoothed and longer laser pulse time will be required in order to get the same energy density on the product. For the longer laser pulse times the energy packages will be more stable.

According to the method of the present invention the laser beam is thus put out of focus versus the moving web. In a further preferred embodiment according to the present invention a method is provided of putting an attenuator or diaphragm in the laser beam path in order to put the laser beam out of focus.

Figure 4:
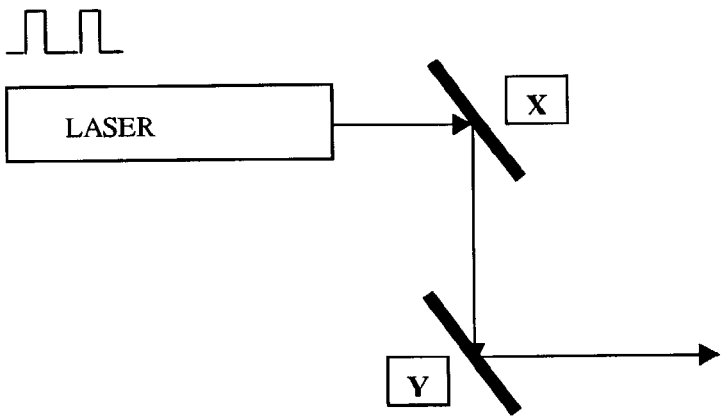
FIG. 4 shows vector lasers (in order to control the laser energy density, and peak intensity on the product), making use of a pulsed laser as shown in FIG. 3, and of two galvano mirrors providing ability to write continuously in two dimensions.

FIG. 4 is illustrative for vector lasers: such vector lasers, having two galvano mirrors, make use of a pulsed laser as described in the concept with respect to pulsed lasers in combination with moving deflecting mirrors hereinbefore. The same technique as described therein is used in order to control the laser energy density and peak intensity on the product (the film material of the present invention) to be marked. With the vector laser two galvano mirrors are used, providing ability to write continuously in two dimensions. In this concept the risk exists that certain mark spots are hit twice (so-called "cross points") which will cause fog spots or stronger burn inns. In order to prevent occurrence of the said "cross points" a special font driver software is used. According to the method of the present invention an apparatus for use in the system as set forth hereinbefore, is provided with font driver software, thereby preventing double marked spots or cross points, wherein characters or figures are created by isolated dot marks.

According to the embodiment as set forth hereinbefore, a laser marking apparatus for use in the system of the present invention is provided with one or more vector laser(s). Thus an apparatus is provided wherein said one or more laser beam(s) is(are) a vector laser or vector lasers, having two galvano mirrors. In a further preferred embodiment the apparatus in the system according to the present invention is provided with one or more electronically pulsed laser or lasers, combined with a moving deflecting mirror, being a rotating polygon or a galvano-oscillating mirror. In a further preferred embodiment said one or more laser beam(s) each independently represent(s) an electronically pulsed laser or electronically pulsed lasers, each independently combined with a moving deflecting mirror.

Figure 5:
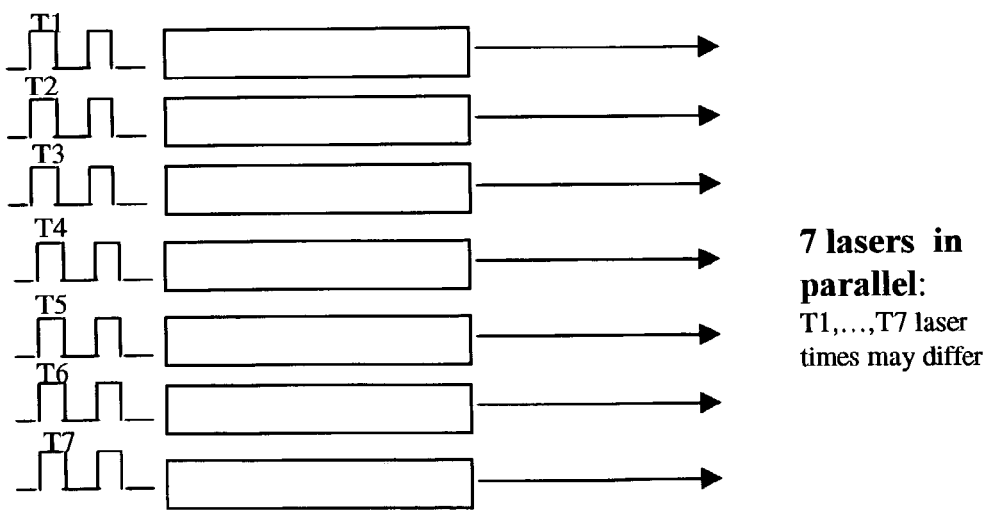
FIG. 5 shows-multiple laser system for high speed marking applications in dot matrix systems.

In FIG. 5 a multiple laser system, particularly suitable for use in high speed marking applications, is used in dot matrix systems. In this concept the lasers are electronically pulsed. Also in these concepts the laser pulses used are often very short so that the energy packages included in those pulses are not easy to control and are difficult to be kept stable. By putting the laser out of focus, problems in beam homogeneity (hot spots), peak intensity in the spot, will be smoothed. Longer laser pulse time will be required in order to get the same energy density on the product. For the longer laser pulse times the energy packages will be more stable. Because of differences in-between the different lasers the pulse width of the different lasers will be controlled independently. Also degradations in the lasers which result in unequal marking quality can be compensated. Lifetime and maintenance cost will clearly be reduced thereby. The system of the present invention is thus, in a preferred embodiment, provided with an apparatus with multiple lasers, wherein each of the said lasers is independently driven and controlled by electronics, driving and controlling burn time or pulse width.

It is clear that such application of laser marking is not restricted to photosensitive materials, nor is it more particularly restricted to X-ray materials, but that it can be applied, if required, to all materials wherein such a mark is advantageously suitable for use, more particularly for identification purposes.

According to the present invention the method of laser marking is applied to a member selected from the group consisting of films, foils, plastics (such as polyethylene, polypropylene and polystyrene, which are transparent to laser energy at certain wavelengths) and synthetic materials, where a controlled burning onto or into, or a controlled ablation is desired.

This means that laser marking is also applicable to packagings, as most of those packagings make use of foils, plastics and synthetic materials mentioned hereinbefore. Cassettes wherein intensifying screens are mounted, are e.g. objects suitable for laser marking, making use of the apparatus of the present invention as well as of the method of the present invention. Furthermore all objects coated with a foil, a plastic or a synthetic material, and, more in particular, any object coated with a protective layer having such a composition is suitable for being laser marked by the method and by means of the laser marking apparatus as set forth.

So intensifying screens coated with luminescent phosphors, absorbing X-rays and directly emitting ultra-violet radiation, blue or green light and applied in combination with X-ray films, made sensitive to light of the suitable wavelength range, as well as storage phosphor screens or panels (also called photostimulable phosphor screens) for "Computed Radiography" are perfectly laser-markable, making use of the apparatus of the present invention as well as of the method of the present invention. Said "Computed Radiography" (CR) systems can be broadly categorized as primary digital and secondary digital systems, wherein primary digital systems imply direct conversion of the incident radiation on a sensor into usable electrical signals to form a digital image and wherein secondary digital systems, on the other hand, involve an intermediary step in the conversion of radiation to a digital image.

In a more preferred embodiment laser marking is applied to a moving web which is a light-sensitive product, or thus a moving web or support, coated with one or more light-sensitive layers, as e.g. an X-ray or radiographic film material. The light-sensitive (photosensitive) layer(s) may be coated on one or both sides of the support: films for mammography and hard-copy films like laser films are normally coated on only one side of the support, whereas films for e.g. chest imaging are coated on both sides, wherein the photosensitive layers are coated symmetrically or asymmetrically (with respect to sensitivity, contrast, and in particular cases even with respect to their spectrally sensitivities) in order to provide the best speed and image quality (from the point of view of sharpness and graininess), thus offering high diagnostic value for the examining medicines. Other double-side coated film materials or duplitized materials are e.g. industrial non-destructive testing films, dental films and the like. Light-sensitive emulsion crystals are regular grains as e.g. cubic grains, preferably having a homogeneous crystal size distribution in favor of high gradation or contrast, but for ecological reasons—saving silver coating amounts—and image definition tabular silver halide grains are preferred in most cases, wherein said tabular grains, accounting for at least 50%, more preferably for more than 70% and even more preferably for more than 90% of the total projective surface of all grains have an average thickness of less than 0.30 $\mu$m and an average aspect ratio (defined as average ratio of equivalent circle diameter and thickness) of at least 5:1, wherein the homogeneity of those tabular grains is in favor of desired higher contrasts or gradations.

It is clear that a mixture of grain shapes and/or grain sizes is not excluded, nor are excluded differences in grain shapes and/or in adjacent layers. Apart from grain shapes it is clear that any silver halide composition may be used as there is silver chloride, silver bromide, or silver iodide, but also mixed halides, whether or not homogenously distributed over the grain volume: silver chlorobromide, silver chloroiodide, silver chlorobromoiodide, silver bromoiodide and silver bromochloroiodide, wherein the first called halide is present in the highest amount.

The apparatus used in the system and method of the present invention as set forth hereinbefore, advantageously provides characters or marks which are formed on a moving web without causing deformation or deterioration on imaging surfaces as e.g. on an X-ray film used as a photosensitive material, wherein said marks are established safely and clearly without causing sparks or combustion phenomena. Laser marking in a system as set forth by means of a laser marking apparatus and by the methods of the present invention enables a contact-free procedure and in addition it is ink-free which makes it long-lasting and solvent-free and, thus, more friendly to the environment. As already said before speeds (without however effectively being limited hereto) up to 10,000 mm/sec are possible with a $CO_2$ laser while Nd-YAG laser allows up to 2000 mm/sec, thus offering a versatile solution for the problems as set forth above.

Having described in detail preferred embodiments of the current invention, it will now be apparent to those skilled in the art that numerous variations and modifications can be made therein without departing from the scope of the invention as defined in the appending claims.

The invention claimed is:

1. A system for laser printing indicia on a moving web, characterized in that said system comprises an apparatus having at least one laser beam directed at said moving web, a jet of air arranged to transport particles dislodged by said laser beam, an extraction unit and a tunnel with an open entry side and an exit side wherein said jet of air enters said open entry side and exits said exit side and said extraction unit receives said air from said exit side.

2. A system according to claim 1, wherein in said apparatus said at least one laser beam is representing a laser in continuous mode, each independently provided with an acousto optic deflector crystal (AOD).

3. A system according to claim 1, wherein in said apparatus said at least one laser beam is a vector laser having two galvano mirrors.

4. A system according to claim 3, wherein said apparatus further comprises font driver software capable of preventing double marked spots or cross points and wherein characters or figures are created by isolated dot marks.

5. A system according to claim 1, wherein in said apparatus said at least one laser beam each independently represents an electronically pulsed laser each independently combined with a moving deflecting mirror.

6. A system according to claim 5, wherein said moving deflecting mirror is a rotating polygon or a galvano-oscillating mirror.

7. A according to claim 6, wherein said apparatus further comprises font driver software capable of preventing double marked spots or cross points and wherein characters or figures are created by isolated dot marks.

8. A system according to claim 5, wherein said apparatus further comprising font driver software capable of preventing double marked spots or cross points and wherein characters or figures are created by isolated dot marks.

9. A system according to claim 1, provided with an apparatus having multiple lasers, wherein each of the said lasers is independently driven and controlled by electronics, driving and controlling burn time or pulse width.

10. A system according to claim 9, where a penetration depth for each laser is independently controlled by said electronics, driving and controlling burn time or pulse width.

11. A laser marking method characterized by the step of directing said jet of air flow from an open entry side of an extraction tunnel to an exit side of the extraction tunnel of the system according to claim 1 and exposing said moving web to said laser beam between said entry side and said exit side.

12. Method according to claim 11, wherein said product flow is carried by said jet of air, skimming on the laser-impinging surface and further being directed from the open entry side of the extraction tunnel towards the exit side of the extraction tunnel in the moving direction of the web.

13. Method according to claim 12, wherein extraction proceeds by means of a high speed extraction unit at the exit side of the said tunnel.

14. Laser marking method according to claim 12, wherein a laser penetration depth is held constant by keeping the laser energy density on said web stable by applying said laser in continuous mode at a fixed power level in combination with an acousto optic deflector, wherein for every frequency used or for every deflection position the energy density on the product is tuned.

15. Method according to claim 11, wherein extraction proceeds by means of a high speed extraction unit at the exit side of the said tunnel.

16. Laser marking method according to claim 15, wherein a laser penetration depth is held constant by keeping the laser energy density on said web stable by applying said laser in continuous mode at a fixed power level in combination with an acousto optic deflector, wherein for every frequency used or for every deflection position the energy density on the product is tuned.

17. Laser marking method according to claim 11, wherein a laser penetration depth is held constant by keeping the laser energy density on the said web stable by applying said laser in continuous mode at a fixed power level in combination with an acousto optic deflector, wherein for every frequency used or for every deflection position the energy density on the product is tuned.

18. Method according to claim 11, wherein an AOD crystal tunes a laser amplitude for each frequency deflection position by adjusting dwell time.

19. Method according to claim 11, wherein the laser beam is put out of focus versus the moving web.

20. Method according to claim 11, putting an attenuator or a diaphragm in the laser beam path.

21. Method according to claim 11, wherein the moving web is a member selected from the group consisting of films, foils, plastics and synthetic materials.

22. Method according to claim 11, wherein the moving web is a light-sensitive film material.

23. Marking a moving web comprising the step of exposing said moving web to said at least one laser beam of said system of claim 1.

24. A system for laser printing indicia on a moving web comprising:
   a tunnel for passing said web there through comprising an open entry side and an exit side;
   at least one laser beam in said tunnel directed at said web;
   a jet of air passing through said tunnel from said open entry side to said exit side; and
   an extraction unit for receiving said jet of air from said exit side.

25. A method for laser marking on a substrate comprising:
   moving said substrate through an apparatus comprising a tunnel with an open entry side and an exit side;
   exposing said substrate to at least one laser beam directed at said substrate within said apparatus between said open entry side and said exit side;
   transporting particles dislodged by said laser beam by a jet of air wherein said jet of air enters said open entry side and exits said exit side;
   extracting said jet of air with an extraction unit wherein said extraction unit receives said jet of air from said exit side.

* * * * *